(12) United States Patent
Ueno et al.

(10) Patent No.: US 8,181,632 B2
(45) Date of Patent: May 22, 2012

(54) SUPERCHARGER

(75) Inventors: Hiroshi Ueno, Tondabayashi (JP);
Toshihiko Shiraki, Yao (JP); Akio Oshima, Neyagawa (JP); Masaki Abe, Kashiwara (JP); Masaaki Ohtsuki, Kashihara (JP); Ryuuji Nakata, Osaka (JP); Shigenori Bando, Nara (JP); Tomonori Nakashita, Suita (JP); Takehisa Kida, Izumisano (JP); Tetsuro Inoue, Kashiwara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 908 days.

(21) Appl. No.: 12/225,666

(22) PCT Filed: Mar. 27, 2007

(86) PCT No.: PCT/JP2007/056440
§ 371 (c)(1),
(2), (4) Date: Sep. 26, 2008

(87) PCT Pub. No.: WO2007/116754
PCT Pub. Date: Oct. 18, 2007

(65) Prior Publication Data
US 2009/0101087 A1  Apr. 23, 2009

(30) Foreign Application Priority Data

Mar. 28, 2006 (JP) ................................ P2006-087299
Sep. 29, 2006 (JP) ................................ P2006-268920

(51) Int. Cl.
*F04B 17/00* (2006.01)
*F04B 35/04* (2006.01)
*F01D 25/08* (2006.01)
*F04D 29/58* (2006.01)
*F02B 33/00* (2006.01)

(52) U.S. Cl. ..................... 123/559.1; 417/406; 417/407; 415/177

(58) Field of Classification Search .................. 417/406, 417/407; 415/177; 123/559.1
See application file for complete search history.

(56) References Cited

U.S. PATENT DOCUMENTS 4,179,247 A * 12/1979 Osborn ........................ 417/406
5,161,960 A * 11/1992 Smith .......................... 417/407

FOREIGN PATENT DOCUMENTS

| JP | 4-183933 | 6/1992 |
| JP | 5-141259 | 6/1993 |
| JP | 7-150961 | 6/1995 |
| JP | 10-19045 | 1/1998 |
| JP | 2000-130176 | 5/2000 |

* cited by examiner

*Primary Examiner* — Thomas Denion
*Assistant Examiner* — Michael Carton
(74) *Attorney, Agent, or Firm* — McGinn IP Law Group, PLLC (57) ABSTRACT

A supercharger includes a housing, and a turbine shaft supported in a center hole in the housing through rolling bearings. Lubricating oil for the rolling bearings exists only within the housing. A cooling water jacket is provided within a body portion of the housing over a region from one axial end portion of the body portion to the other axial end portion thereof.

19 Claims, 8 Drawing Sheets

SUPERCHARGER

TECHNICAL FIELD

This invention relates to a supercharger.

BACKGROUND ART

Turbochargers have been extensively used in automobiles since they can further enhance the performance of an engine. The turbocharger includes a housing, and a turbine shaft supported in a center hole in the housing through bearings. In such a conventional turbocharger, the bearings are supplied with engine oil to be lubricated. Therefore, many holes serving as passages for engine oil are formed in the small housing of the turbocharger as described in Patent Literatures 1 and 2.
Patent Literature 1: JP-A-5-141259 Publication
Patent Literature 2: JP-A-10-19045 Publication

DISCLOSURE OF THE INVENTION

Problem that the Invention is to Solve

In the turbochargers described in Patent Literatures 1 and 2, many holes are formed in a body portion of the housing as described above. Therefore, from the viewpoint of a space, it is difficult to form a coolant passage (for cooling the turbocharger) in the body portion of the housing, and besides a cooling water jacket can be formed only at part of the body portion. Therefore, there is encountered a problem that a cooling effect by a coolant is low, and therefore the temperature of the bearing becomes high, so that seizure is liable to occur.

Furthermore, in the turbochargers described in Patent Literatures 1 and 2, engine oil contaminated with foreign matters such as carbon sludge produced at the engine is supplied to the bearing. Therefore, particularly when the bearing is a rolling bearing, the durability of this rolling bearing is lowered. Therefore, a filter or the like for removing such foreign matters is provided in an intermediate portion of the engine oil passage. Even in this case, the foreign matters can not be completely removed, and besides there is encountered a problem that the structure becomes complicated.

This invention has been made in view of the above problems, and an object of the invention is to provide a supercharger in which the performance of a rolling bearing can be maintained with a simple construction, and also a cooling effect can be enhanced.

Means for Solving the Problem

The above object has been achieved by a supercharger of the present invention comprising a housing having a cooling water jacket provided therein, and a turbine shaft supported in a center hole in a center portion of the housing through a rolling bearing, a turbine being mounted on one end portion of the turbine shaft and disposed exteriorly of the housing in an axial direction; wherein lubricating oil for the rolling bearing exists only within the housing; and the cooling water jacket is provided within a body portion of the housing over a region from one axial end portion of the body portion to the other axial end portion thereof.

In this construction, the lubricating oil for the rolling bearing exists only within the housing, and therefore the contamination of the lubricating oil by factors outside the supercharger such as carbon sludge developing in an engine as in the conventional structure can be prevented. Therefore, the performance of the rolling bearing can be prevented from being lowered by the lubricating oil. And besides, any construction for receiving lubricating oil from the exterior is not needed, and therefore the structure is simplified. Further, any passage for receiving the lubricating oil from the exterior does not need to be provided within the body portion of the housing. Therefore, the cooling water jacket can be provided within the body portion of the housing over the wide range from the one axial end portion to the other axial end portion. A cooling effect by this cooling water jacket can be enhanced, and the rolling bearing can be cooled over the wide range in the axial direction of the housing.

In this supercharger, preferably, the cooling water jacket comprises a passage for flowing a coolant at least more than one round around the center hole in a circumferential direction. In this construction, by flowing the coolant along the passage, the coolant is prevented from residing within the housing. By thus flowing the coolant without allowing the coolant to reside within the housing, the cooling effect by the cooling water jacket can be further enhanced. Furthermore, by flowing the coolant at least more than one round in the circumferential direction through the passage, the cooling can be effected over the wide range.

According to another aspect of the invention, there is provided a supercharger comprising a housing having a cooling water jacket provided therein, and a turbine shaft supported in a center hole in a center portion of the housing through a rolling bearing, a turbine being mounted on one end portion of the turbine shaft and disposed exteriorly of the housing in an axial direction; wherein the cooling water jacket comprises a passage for flowing a coolant at least more than one round around the center hole in a circumferential direction.

In this construction, by flowing the coolant along the passage, the coolant is prevented from residing within the housing. By thus flowing the coolant without allowing the coolant to reside within the housing, the cooling effect by the cooling water jacket can be enhanced. Furthermore, by flowing the coolant at least more than one round in the circumferential direction through the passage, the cooling can be effected over the wide range. Therefore, the rolling bearing can be efficiently cooled, and the temperature of the rolling bearing is prevented from becoming high, thereby preventing damage due to seizure and others, and the performance of the rolling bearing can be maintained.

In the above supercharger, preferably, the passage is constructed such that the coolant is flowed circumferentially in one direction, and then is turned back, and is flowed circumferentially in the other direction opposite to the one direction. With this construction, the passage for flowing the coolant at least more than one round around the center hole in the circumferential direction can be easily obtained. Also, that portion of the passage extending beyond one round can be provided along and near to the center hole, and the cooling effect for the rolling bearing provided within this center hole can be enhanced.

In the above supercharger, preferably, the passage includes at least one first passage portion for flowing the coolant in the one direction, at least one second passage portion for flowing the coolant in the other direction, and at least one turning-back passage portion interconnecting the first and second passage portions, and the first passage portion and the second passage portion are juxtaposed in the axial direction. In this construction, the coolant can be flowed along the first passage portion circumferentially in the one direction, and then can be flowed along the second passage portion circumferentially in the other direction after passing through the turning-back passage portion, and residence of the coolant is prevented, and the cooling effect can be enhanced. Since the first and second passage portions are juxtaposed in the axial direction, the passage can be arranged densely within the housing, and the cooling effect can be enhanced.

In the above supercharger, preferably, within the body portion, part of the cooling water jacket is disposed between the turbine and the rolling bearing. In this construction, heat from the turbine mounted on the one end portion of the turbine shaft can be effectively absorbed by this part of the cooling water jacket, and a temperature rise of the rolling bearing can be suppressed.

In the above supercharger, preferably, a thermal shield member is interposed between the turbine and the housing, and an air chamber is interposed between the thermal shield member and the housing. In this construction, heat from the turbine is blocked by the thermal shield member, and a temperature rise of the housing and the rolling bearing due to this heat can be suppressed. And besides, thanks to the provision of the air chamber between the thermal shield member and the housing, heat from the turbine is less liable to be transferred to the housing, and a temperature rise of the housing and the rolling bearing can be further suppressed.

In the above supercharger, a tank portion for storing the lubricating oil may be provided within the housing or in the vicinity of the body portion of the housing, and further there may be provided supply means for supplying the lubricating oil from the tank portion to the center hole. In this construction, the structure in which the lubricating oil for the rolling bearing exists only within the housing can be easily obtained.

In this case, the supply means may comprise a blade member for producing an air flow within the center hole in accordance with the rotation of the turbine shaft so as to render a pressure within the center hole negative relative to a pressure within the tank portion, and a lubricant passage leading from the tank portion to the center hole so that the lubricating oil can be drawn up from the tank portion by the negative pressure to flow to the center hole via the lubricant passage.

With this construction, when the turbine shaft is rotated, a pressure negative relative to the pressure of the tank portion is produced within the center hole by the blade member, and the lubricating oil is supplied from the tank portion to the center hole via the lubricant passage.

In the above supercharger, preferably, the supply means includes a wick member provided between the tank portion and the center hole so as to supply the lubricating oil from the tank portion to the center hole by a capillary action of the wick member. With this construction, the lubricating oil is supplied from the tank portion to the center hole by a capillary action of the wick member. Therefore, even when the rotation of the turbine shaft is stopped, the lubricating oil can be supplied to the rolling bearing received within the center hole.

In the supercharger of the invention in which the lubricating oil for the rolling bearing exists only within the housing, any passage for receiving the lubricating oil from the exterior is not needed. Therefore, the cooling water jacket can be provided within the body portion of the housing over the wide range from the one axial end portion to the other axial end portion. Therefore, the cooling effect by this cooling water jacket can be enhanced, and the rolling bearing can be cooled over the wide range in the axial direction of the housing.

BEST MODE FOR CARRYING OUT THE INVENTION

A preferred embodiment of the present invention will now be described with reference to the drawings.

Figure 1:
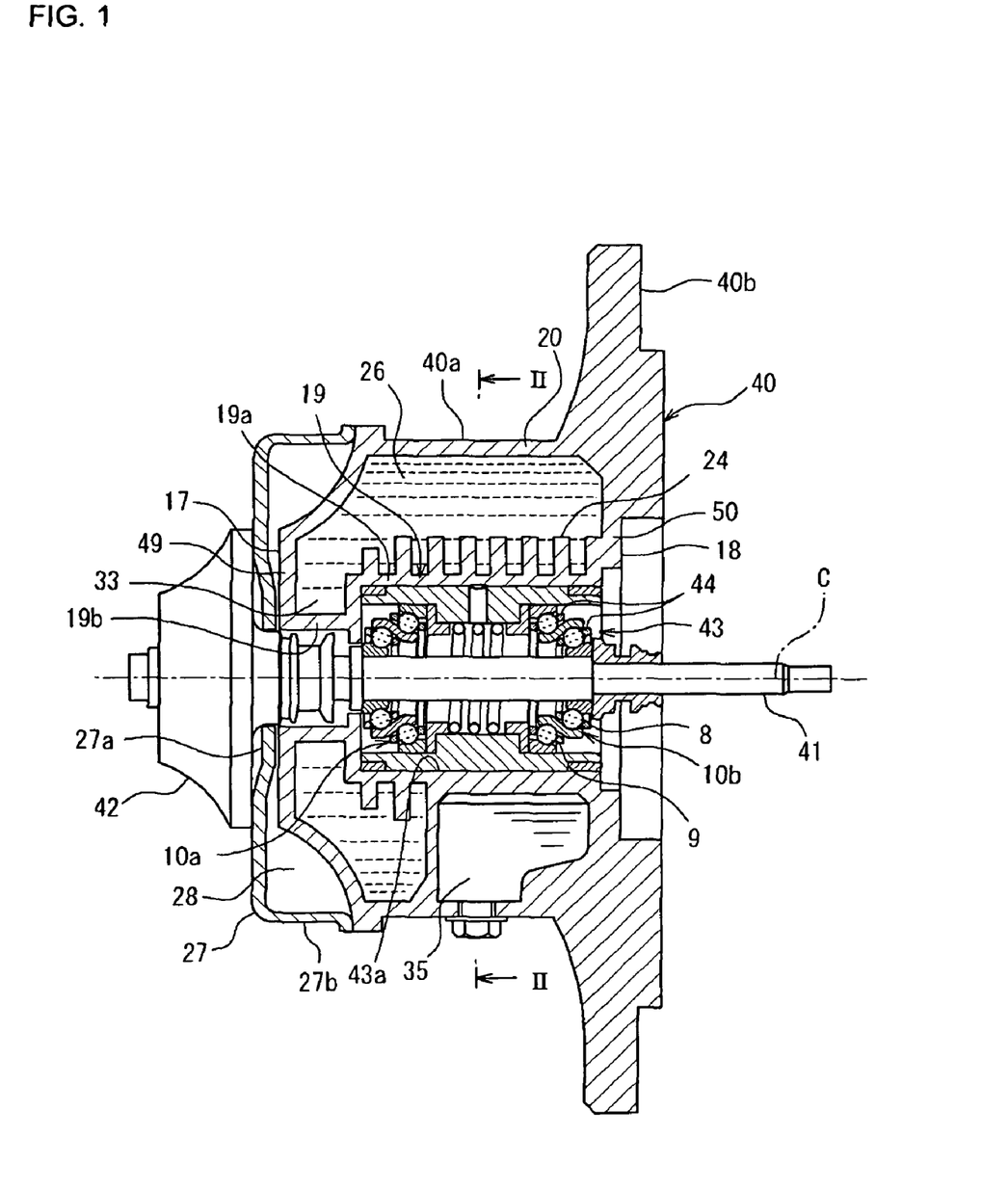
FIG. 1 is a cross-sectional view showing one preferred embodiment of a supercharger of the present invention.

FIG. 1 is a cross-sectional view of one preferred embodiment (first embodiment) of a supercharger of the invention. This supercharger comprises a housing 40, and a turbine shaft 41 is supported in the housing 40 through rolling bearings 10$a$ and 10$b$. A turbine 42 is mounted on one end portion of the turbine shaft 41, and is disposed exteriorly of the housing 40 in an axial direction, and a compressor (not shown) is mounted on the other end portion of the turbine shaft 41. This supercharger serves as a turbocharger for an engine of an automobile. The rolling bearings 10$a$ and 10$b$ are spaced from each other in a direction of an axis C, and therefore are arranged in two rows.

The housing 40 includes a body portion 40$a$ having a cylindrical outer periphery, and a flange portion 40$b$ extending radially outwardly from an outer peripheral portion of an end portion 50 of the body portion 40$a$. The body portion 40$a$ has a center hole 43 formed in a radially-central portion (center portion) thereof, and this center hole 43 is a round hole having its centerline (axis) coinciding with the axis C. The pair of rolling bearings 10$a$ and 10$b$ are provided within the center hole 43. The turbine shaft 41 is supported by these rolling bearings 10$a$ and 10$b$ so as to rotate about the axis C.

The body portion 40$a$ of the housing 40 has a cooling water jacket 26 provided therein. The cooling water jacket 26 is provided within the body portion 40$a$ over a region extending from one axial end portion 49 thereof to the other axial end portion 50 thereof. More specifically, with respect to the axial direction, the cooling water jacket 26 is provided over a range from an inner surface of a side wall 17 at the one end portion 49 of the body portion 40$a$ to an inner surface of a side wall 18 at the other end portion 50, and an axial dimension of the cooling water jacket 26 is larger than that of the center hole 43. With this arrangement, the cooling water jacket 26 extends axially to include regions disposed radially outwardly respectively of the pair of rolling bearings 10$a$ and 10$b$.

With respect to the circumferential direction of the body portion 40$a$, the cooling water jacket 26 has an annular portion (extending continuously in the circumferential direction) disposed at the turbine (42) side and surrounding one rolling bearing 10$a$ close to the turbine 42. A tank portion 35 for storing lubricating oil to be supplied to the rolling bearings 10$a$ and 10$b$ is formed within the body portion 40$a$, that is, at a lower portion (disposed radially outwardly of the other rolling bearing 10$b$) of that portion of the interior of the body portion 40$a$ disposed at the other end portion (50) side.

Thus, the cooling water jacket 26 encloses the center hole 43 in the axial direction and the radial direction except at the region where the tank portion 35 exists.

The cooling water jacket 26 is formed as a space portion defined by the annular side wall 17 at the one end portion 49 of the body portion 40a, part of the annular side wall 18 at the other end portion 50, an inner peripheral wall 19 forming the center hole 43, and an outer peripheral wall 20 provided at the outer periphery of the body portion 40a. A coolant for cooling purposes exists in this space portion so as to cool the rolling bearings 10a and 10b. A plurality of fins 24 are formed on and project radially outwardly from the inner peripheral wall 19, and enhance the cooling effect for the rolling bearings 10a and 10b. The inner peripheral wall 19 includes a larger-diameter tubular portion 19a defining an outer peripheral surface of the center hole portion 43, and a smaller-diameter tubular portion 19b (smaller in diameter than the larger-diameter tubular portion 19a) extending from the larger-diameter tubular portion 19a toward the one axial end 49 through a stepped portion.

Further, within the body portion 40a, the cooling water jacket 26 has a portion disposed between the turbine 42 and the rolling bearing 10a. More specifically, the cooling water jacket 26 has the portion disposed at the one end portion (49) side and extending radially inwardly beyond an inner peripheral surface 43a of the center hole 43. This portion is formed as an annular portion 33. An inner peripheral wall of this annular portion 33 is defined by the smaller-diameter tubular portion 19b, and a side wall of the annular portion 33 is defined by an inner peripheral portion of the side wall 17. With this construction, the annular portion 33 is interposed between the turbine 42 and the rolling bearing 10a, and therefore heat from the turbine 42 is efficiently absorbed by the coolant located in the annular portion 33, and particularly a temperature rise of the rolling bearing 10a near to the turbine 42 can be suppressed.

Figure 6:
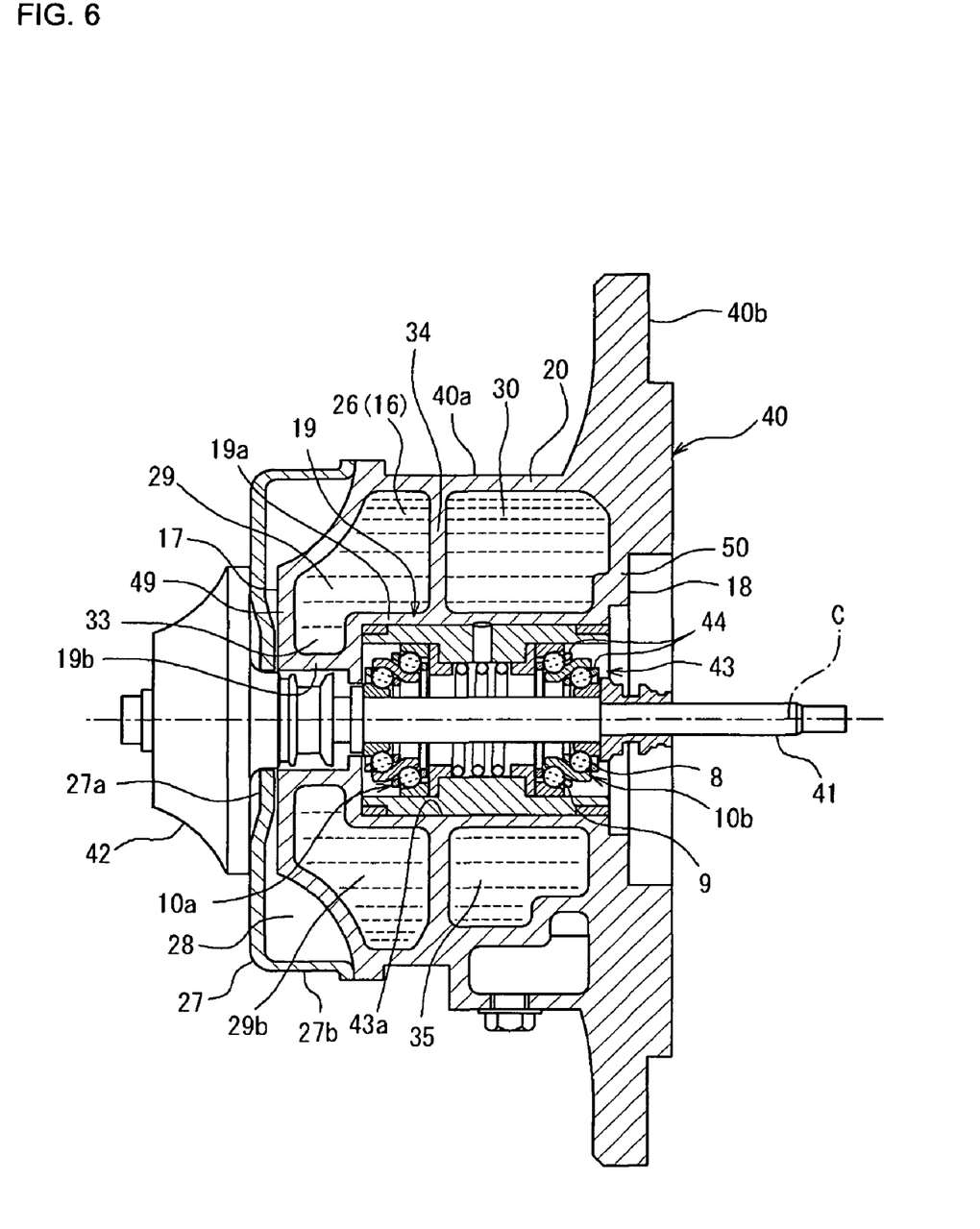
FIG. 6 is a cross-sectional view of another embodiment of a supercharger of the invention.

FIG. 6 is a cross-sectional view of another embodiment (second embodiment) of a supercharger of the invention. This supercharger (turbocharger), like the supercharger of FIG. 1, comprises a housing 40, and a turbine shaft 41 supported in a center hole 43 in a central portion of the housing 40 through rolling bearings 10a and 10b. The housing 40 has a cooling water jacket 26 provided around the center hole 43. Although this cooling water jacket 26 is different in form from the cooling water jacket 26 of FIG. 1, the housing 40, the turbine shaft 41 and the rolling bearings 10a and 10b are similar in construction to those of FIG. 1.

Figure 7:
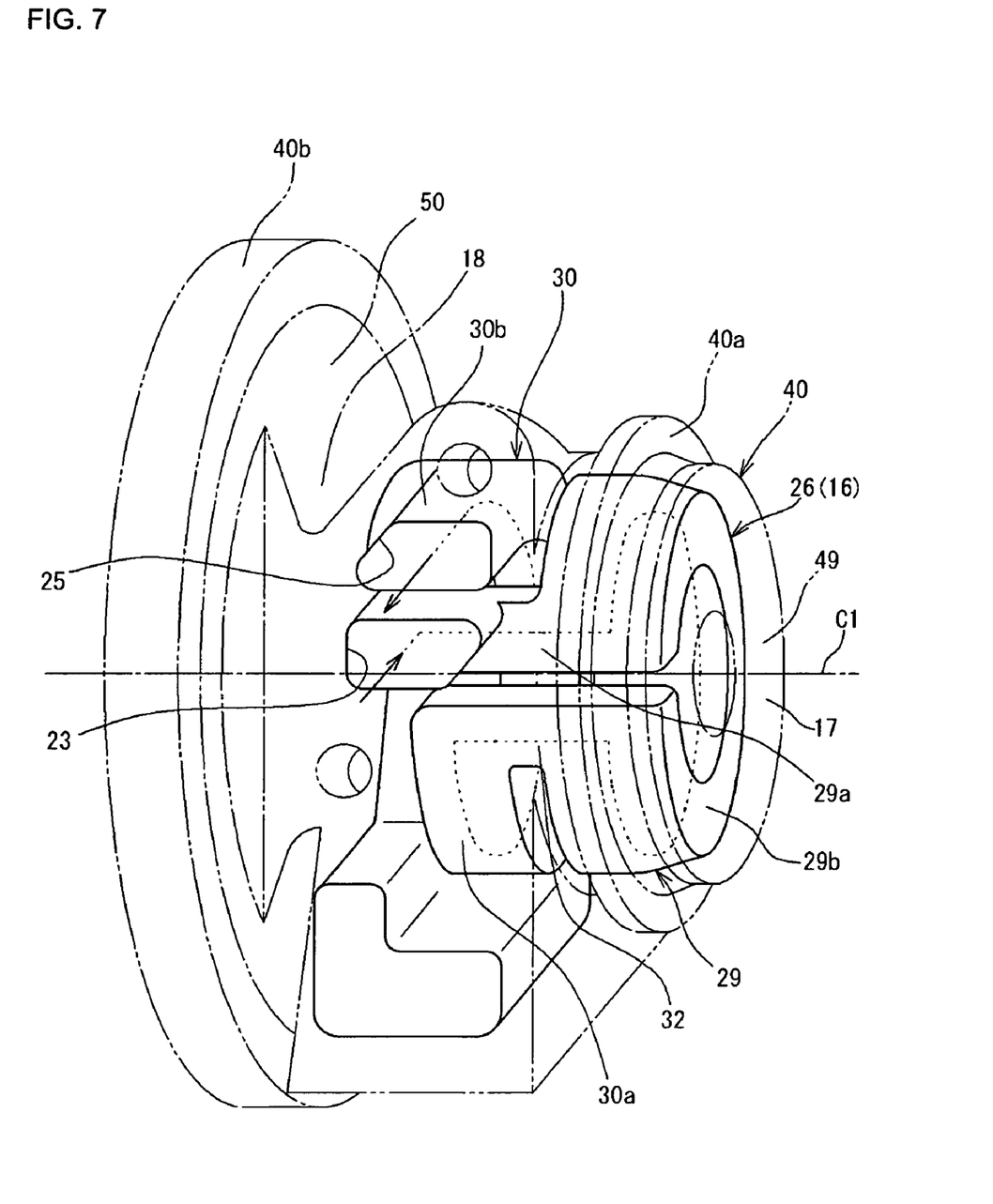
FIG. 7 is a perspective view showing a housing of FIG. 6 and a cooling water jacket provided in the housing.

FIG. 7 is a perspective view showing the housing 40 and the cooling water jacket 26 provided within this housing, and the cooling water jacket 26 is indicated in solid lines while the outer shape of the housing 40 is indicated in dots-and-dash lines. The cooling water jacket 26 shown in FIGS. 6 and 7 comprises a passage 16 for flowing a coolant at least more than one round (360°) around the center hole 43 (in which the pair of rolling bearings 10a and 10b are provided) in the circumferential direction. Within a body portion 40a of the housing 40, this passage 16 is provided over a range from one axial end portion 49 to the other axial end portion 50. With this arrangement, the cooling water jacket 26 extends axially to include regions disposed radially outwardly respectively of the pair of rolling bearings 10a and 10b.

The passage 16 forming the cooling water jacket 26 is constructed such that the coolant is flowed circumferentially in one direction, and then is turned back, and is flowed circumferentially in the other direction opposite to the one direction. More specifically, this passage 16 comprises a hole formed in the housing 40 and extending long in the circumferential direction, and this passage 16 includes one first passage portion 29 for flowing the coolant circumferentially in one direction (clockwise direction as viewed axially from the turbine (42) side) around the axis C, one second passage portion 30 for flowing the coolant circumferentially in the other direction (counterclockwise direction as viewed axially from the turbine (42) side) opposite to the one direction, and one turning-back passage portion 32 interconnecting the first and second passage portions 29 and 30 and changing the direction of flow of the coolant through 180 degrees. With respect to an axial arrangement of the first passage portion 29, the second passage portion 30 and the turning-back passage portion 32 within the housing 40, these passage portions are arranged over the range from an inner surface of a side wall 17 at the one end portion 49 of the body portion 40a to an inner surface of a side wall 18 at the other end portion 50.

Within the body portion 40a of the housing 40, the first passage portion 29 is disposed at the one end portion (49) side, and the second passage portion 30 is disposed at the other end portion (50) side, with a wall 34 (see FIG. 6) disposed between the first and second passage portion 29 and 30. The first passage portion 29 includes an inlet portion 29a of a bent shape having an opening 23 open to the outer peripheral surface of the housing 40, and an annular portion 29b of a generally 180 degrees extending continuously from the inlet portion 29a. This annular portion 29b is continuous with an upstream side of the turning-back passage portion 32. The second passage portion 30 includes an annular portion 30a of a generally 180 degrees continuous with a downstream side of the turning-back passage portion 32, and a straight outlet portion 30b which is continuous with the annular portion 30a and has an opening 25 open to the outer peripheral surface of the housing 40. The annular portion 29b of the first passage portion 29 and the annular portion 30a of the second passage portion 30 are juxtaposed in the axial direction (that is, adjoin in a direction parallel to the axis C). The annular portion 29b of the first passage portion 29 has a constant flow passage area (cross-sectional area), and also the annular portion 30a of the second passage portion 30 has a constant flow passage area, and therefore the coolant can be smoothly flowed through these annular portions. Further, in the cross-section of the passage 16, corner portions are rounded (or curved) so that the flowing coolant will be less liable to be stagnant or be disturbed. Further, preferably, a corner portion of the interconnecting portion between the first passage portion 29 and the turning-back passage portion 32, as well as a corner portion of the interconnecting portion between the turning-back passage portion 32 and the second passage portion 30, is rounded (or curved) so as to achieve a smooth flow of the coolant.

The first passage portion 29 is a generally annular portion disposed radially outwardly of one rolling bearing 10a (close to the turbine 42) and extending axially to the one end portion 49 close to the turbine 42. The second passage portion 30 is a generally annular portion disposed radially outwardly of the other rolling bearing 10b disposed close to a compressor (not shown). With this arrangement, the passage 16 encloses the center hole 43 (in which the rolling bearings 10a and 10b are provided) in the axial direction and the radial direction. A tank portion 35 for storing lubricating oil to be supplied to the rolling bearings 10a and 10b is formed at a portion of the interior of the body portion 40a, and is disposed at the other end portion (50) side, the tank portion 35 being formed integrally with the body portion 40a.

Thus, the passage 16 is formed into a spiral shape with the turning-back portion, and circles twice (two rounds) around the center portion (the center hole 43) of the housing 40. The coolant is supplied to this passage 16 from a coolant supply source (not shown) provided exteriorly of the housing 40, and this coolant is passed through the inlet portion 29a and the annular portion 29b of the first passage portion 29, the turning-back passage portion 32, and the annular portion 30a and the outlet portion 30b of the second passage portion 30, and by doing so, the rolling bearings 10a and 10b can be cooled. Then, the coolant thus passing through the housing 40 is returned to the coolant supply source. The coolant supply source can thus supply the coolant to the housing 40, and also can cool the coolant whose temperature is raised by heat exchange during the passage of the coolant through the housing 40.

Figure 8:
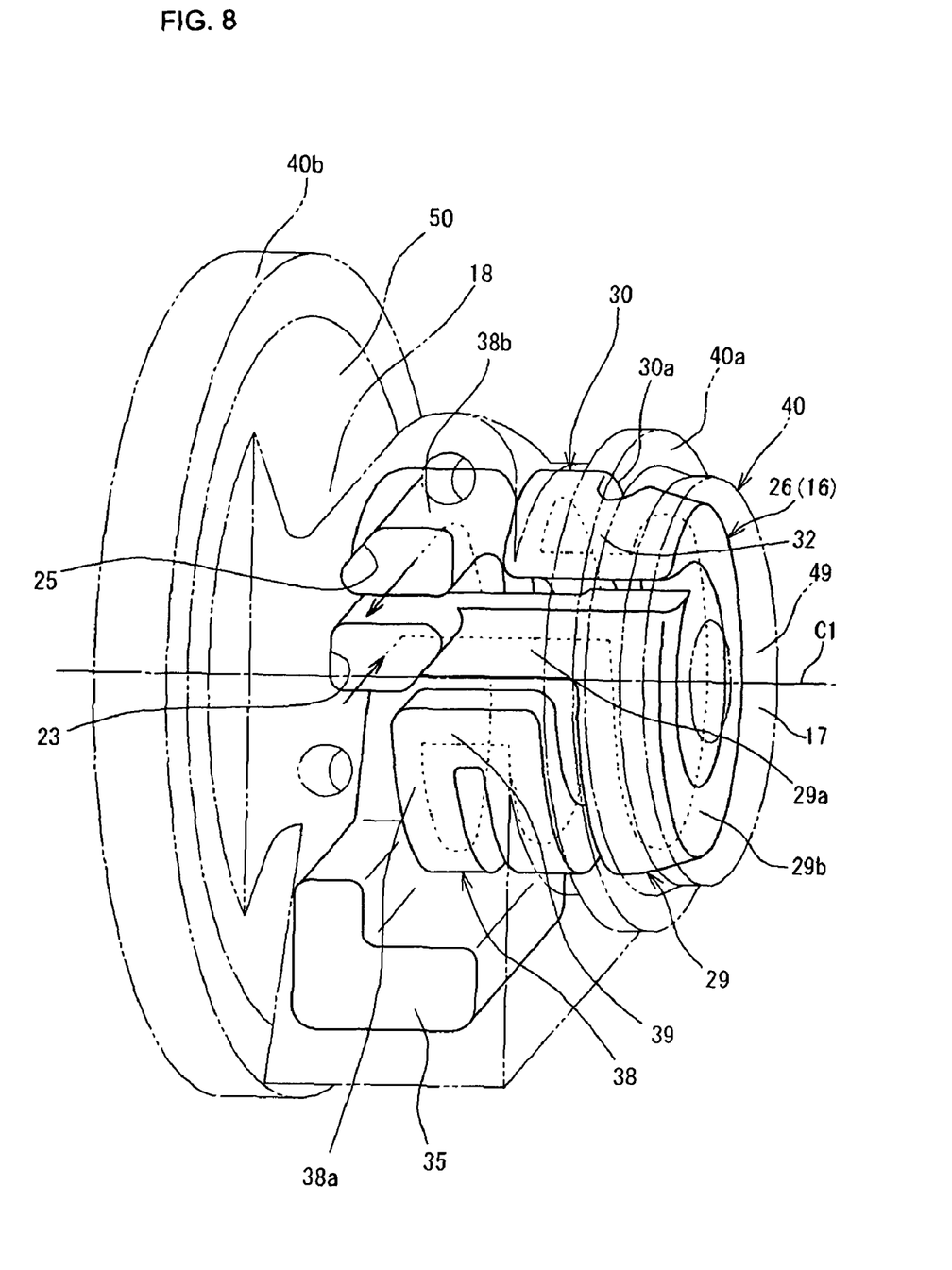
FIG. 8 is a perspective view showing a modified housing and a modified cooling water jacket provided in the housing.

FIG. 8 shows a modified housing 40 and a modified cooling water jacket 26 provided in the housing 40. In the supercharger of the present invention, the passage 16 forming the cooling water jacket 26 need only to include at least one first passage portion 29, at least one second passage portion 30, and at least one turning-back passage portion 32, and in the embodiment of FIGS. 6 and 7, the passage 16 includes one first passage portion 29, one second passage portion 30, and one turning-back passage portion 32. However, in the modified example of FIG. 8, a passage 16 includes two turning-back passage portions, and further includes a first passage portion 29, a second passage portion 30, and a third passage portion 38.

More specifically, the first passage portion 29 receives the coolant from the supply source (not shown), and flows the coolant circumferentially in one direction (counterclockwise direction as viewed axially from the turbine side) around the axis C. The first turning-back passage portion 32 interconnects the first and second passage portions 29 and 30, and changes the direction of flow of the coolant through 180 degrees. The second passage portion 30 flows the coolant circumferentially in the other direction (clockwise direction as viewed axially from the turbine side) opposite to the one direction. The second turning-back passage portion 39 interconnects the second and third passage portions 30 and 38, and again changes the direction of flow of the coolant through 180 degrees. The third passage portion 38 flows the coolant circumferentially in the one direction (counterclockwise direction as viewed axially from the turbine side) around the axis C, and flows the coolant to the supply source (not shown). An annular portion 29b of the first passage portion 29 and an annular portion 30a of the second passage portion 30 are juxtaposed in the axial direction, and the annular portion 30a of the second passage portion 30 and an annular portion 38a of the third passage portion 38 are juxtaposed in the axial direction. Preferably, a corner portion of the interconnecting portion between the first passage portion 29 and the first turning-back passage portion 32, as well as a corner portion of the interconnecting portion between the first turning-back passage portion 32 and the second passage portion 30, is rounded (or curved) so as to achieve a smooth flow of the coolant. Further, preferably, Further, a corner portion of the interconnecting portion between the second passage portion 30 and the second turning-back passage portion 39, as well as a corner portion of the interconnecting portion between the second turning-back passage portion 39 and the third passage portion 38, is rounded (or curved) so as to achieve a smooth flow of the coolant.

Namely, this passage 16 is formed into a spiral shape with the turning-back portions, and circles three times (three rounds) around the center portion (the center hole 43) of the housing 40. With respect to an axial arrangement of the first passage portion 29, the second passage portion 30, the third passage portion 38, the first turning-back passage portion 32 and the second turning-back passage portion 39, these passage portions are arranged over the range from the inner surface of the side wall 17 at the one end portion 49 of the body portion 40a to the inner surface of the side wall 18 at the other end portion 50. The construction of this modified example is similar to the construction of the embodiment of FIG. 7 except that the passage 16 circles three times around the center portion of the housing 40 and that the direction of flow of the coolant through the first passage portion 29, as well as the direction of flow of the coolant through the second passage portion 30, is different.

The coolant is supplied to the passage 16 from the coolant supply source (not shown) provided exteriorly of the housing 40, and this coolant is passed through an inlet portion 29a and the annular portion 29b of the first passage portion 29, the first turning-back passage portion 32, the annular portion 30a of the second passage portion 30, the second turning-back passage portion 39, and the annular portion 38a and an outlet portion 38b of the third passage portion 38, and by doing so, the rolling bearings 10a and 10b can be cooled. Then, the coolant thus passing through the housing 40 is returned to the coolant supply source.

In the superchargers of the above embodiments, the coolant is flowed along the passage 16, and by doing so, the coolant is prevented from residing within the housing 40. By thus flowing the coolant without allowing the coolant to reside within the housing 40, the cooling effect for the rolling bearings 10a and 10b can be enhanced. Furthermore, the passage 16 flows the coolant at least more than one round in the circumferential direction, the cooling can be effected over the wide range. Therefore, the rolling bearings 10a and 10b can be efficiently cooled. Therefore, the temperature of the rolling bearings 10a and 10b are prevented from becoming high, thus preventing damage due to seizure and others, and the performance of the rolling bearings 10a and 10b can be maintained.

Furthermore, the passage 16 is constructed to circle at least more than one time around the center portion of the housing 40 and more specifically a plurality of times (two or three times), and therefore the flow passage area (cross-sectional area) thereof can be formed into a suitable size. Namely, by forming the flow passage area into the suitable size, the flow passage area can be reduced as compared with the embodiment of FIG. 1 in which the passage 16 circles one time around the center portion of the housing 40. Therefore, the coolant is caused to flow at a certain degree of velocity, and is prevented from residing within the housing 40. Incidentally, preferably, the passage 16 circles not more than three times around the center portion of the housing 40. More preferably, the passage 16 circles not more than two times around the center portion of the housing 40, and preferably circles two times as in the embodiment of FIGS. 6 and 7. The reason for this is that in the third round (the third passage portion 38), the temperature of the coolant becomes considerably high, so that the coolant can not be sufficiently cooled at the supply source (not shown), which often fails to enhance the cooling effect for the bearings 10a and 10b. Furthermore, in the case where the housing 40 is produced by casting, the flow passage area of the passage 16 is reduced when the passage 16 circles more than three times around the center portion of the housing 40, and it is difficult to secure the strength of a core for the casting, and there is a fear that the production of the housing 40 may become difficult. However, in the case where the passage 16 circles two times around the center portion of the housing 40, the production by casing is easy, and besides the precision of the cast product is enhanced.

Furthermore, the coolant is flowed along the passage 16, and therefore can flow smoothly, and a capacity of a pump provided at the coolant supply source can be decreased. Furthermore, the coolant absorbing heat within the housing 40 can be quickly returned to the supply source without allowing the coolant to reside within the housing 40, and the coolant can be cooled at this supply source. Therefore, the rolling bearings 10*a* and 10*b* can be cooled more efficiently with a smaller amount of coolant as compared with the embodiment of FIG. 1.

Furthermore, the passage 16 is constructed such that the coolant is flowed circumferentially in the one direction, and is turned back, and is flowed circumferentially in the other direction opposite to the one direction. Therefore, there is easily obtained the construction in which the coolant is flowed at least more than one round around the center hole 43, and also that portion of the passage 16 extending beyond one round can be provided along and near to the center hole 43. Namely, there is obtained the construction in which the annular portion 29*b* of the first passage portion 29 and the annular portion 30*a* of the second passage portion 30 are juxtaposed in the axial direction, and are disposed near to and radially outwardly of the rolling bearings 10*a* and 10*b*. Thus, the passage 16 is disposed near to the rolling bearings 10*a* and 10*b*, and therefore the cooling effect for the rolling bearings 10*a* and 10*b* can be enhanced. Furthermore, the opening 23 of the inlet portion of the passage 16 and the opening 25 of the outlet portion thereof are disposed close to each other as shown in FIGS. 7 and 8, and the portion of the housing close to the supply source (not shown) can be formed into a compact construction.

Furthermore, in the passage 16 of FIGS. 6 and 7, the first and second passage portions 29 and 30 are juxtaposed, and in the passage 16 of FIG. 8, the first and second passage portions 29 and 30 are juxtaposed, and the second and third passages 30 and 38 are juxtaposed. Therefore, the passage 16 can be arranged densely within the housing 40, and the cooling effect can be enhanced. Furthermore, the passage is formed in the circumferential direction, and therefore the rolling bearings 10*a* and 10*b* can be cooled over the entire periphery thereof, and the rolling bearings 10*a* and 10*b* can be cooled uniformly over the entire periphery thereof. Therefore, the temperature of each of the bearings 10*a* and 10*b* is prevented from becoming high at a localized portion thereof.

Furthermore, the coolant is cooled at the coolant supply source (not shown) provided exteriorly of the housing 40, and the first passage portion 29 through which the supplied coolant first passes is disposed close to the turbine 42, and the second passage portion 30 (and the third passage portion 38) is disposed close to the compressor (not shown). Therefore, the turbine-side portion (42) within the housing 40 where the temperature becomes higher can be efficiently cooled.

Furthermore, in FIG. 6, the annular portion 29*b* of the first passage portion 29 has the generally annular portion 33 disposed at the one end portion 49 of the body portion 42*a* and projecting radially inwardly beyond the inner peripheral surface 43*a* of the center hole 43. Within the body portion 40*a*, this annular portion 33 is disposed between the turbine 42 and the rolling bearing 10*a*. With this arrangement, the annular portion 33 is interposed between the turbine 42 and the rolling bearing 10*a* in the axial direction, and heat from the turbine 42 can be efficiently absorbed by the coolant passing through this annular portion 33, and particularly a temperature rise of the rolling bearing 10*a* close to the turbine 42 can be suppressed.

The turbocharger of each of the above embodiments includes a thermal shield member 27 (see FIG. 1 and FIG. 6) interposed between the turbine 42 and the housing 40. The thermal shield member 27 is made of a ceramics material or metal, and includes a disc-like portion 27*a* interposed between the side wall 17 and the turbine 42, and a cylindrical portion 27*b* extending from the disc-like portion 27*a* toward the housing 40. The proximal portion (the turbine shaft 41) of the turbine 42 is passed through a center hole in the disc-like portion 27*a*, and a close clearance is formed between an inner peripheral edge of this central hole and the outer periphery of the proximal end portion of the turbine 42. A distal end of the cylindrical portion 27*b* is held in contact with the outer peripheral portion of the body portion 40*a* of the housing 40. With this arrangement, an annular air chamber 28 is formed between the thermal shield member 27 and the side wall 17 of the housing 40, that is to say, is defined by the disc-like portion 27*a*, the cylindrical portion 27*b* and the side wall 17. With this construction, radiation heat and air conduction heat from the turbine 42 are blocked by the thermal shield member 27, and a temperature rise of the housing 40 and the bearings 10*a* and 10*b* due to this heat can be suppressed. Further, heat from the turbine 42 is less liable to be transferred to the housing 40 because of the provision of the air chamber 28 between the thermal shield member 27 and the housing 40, so that a temperature rise of the housing 40 and the rolling bearings 10*a* and 10 can be suppressed.

Further, this turbocharger has the lubricating structure in which lubricating oil for the rolling bearings 10*a* and 10*b* exists only within the housing 40.

Figure 2:
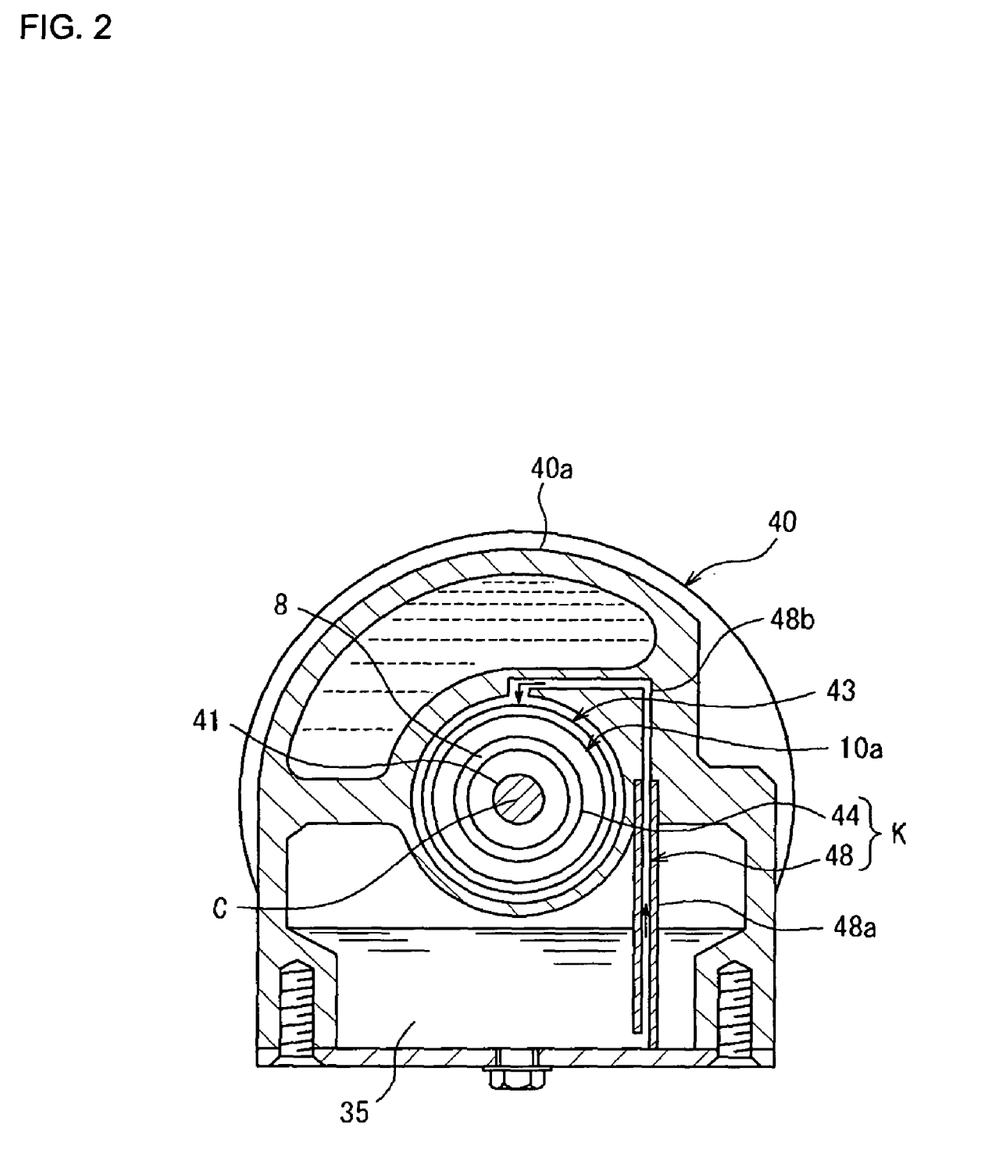
FIG. 2 is a cross-sectional view taken along the line II-II of FIG. 1.

More specifically, although there may be provided a lubricating structure in which lubricating oil is sealed in the center hole 43 of the body portion 40*a* or a lubricating structure in which lubricating oil (grease) is filled in the rolling bearing (10*a*, 10*b*) portions received within the center hole 43, the lubricating structure shown in FIGS. 1 and 2 includes the tank portion 35 formed within the housing 40 so as to store lubricating oil, and supply means K for supplying the lubricating oil to the center hole 43 from the tank portion 35. This supply means K is also provided within the housing 40. FIG. 2 is a cross-sectional view taken along the line II-II of FIG. 1.

The tank portion 35 is defined by a space portion formed by part of the lower portion of the interior of the body portion 40*a*. The lubricating oil in the tank 35 is supplied to the center hole 43 by the supply means K, and is used to lubricate the rolling bearings 10*a* and 10*b* provided within the center hole 43. A passage (not shown) for returning the lubricating oil (which has been used to lubricate the rolling bearings) and excess lubricating oil from the center hole 43 to the tank 35 is formed in the body portion 40*a*.

In FIG. 2, the supply means K includes a passage 48 leading from the tank portion 35 to the center hole 43, and a mechanism for supplying the lubricating oil from the tank portion 35 to the center hole 43 via this passage 48. The passage 48 includes a pipe member 48*a* extending from a bottom portion of the tank portion 35 into the body portion 40*a*, and a hole 48*b* formed in the body portion 40*a* and communicating with the pipe member 48*a*.

Blade members 44 formed at the rolling bearings 10*a* and 10*b* or the turbine shaft 41 can supply the lubricating oil to the center hole 43 via the passage 48. For example, these blade members 44 are provided at rotating portions of the rolling bearings 10*a* and 10*b*, and more specifically are formed at cages 8 and 9 of the rolling bearings 10*a* and 10*b* which hold balls (rolling elements). With this construction, when the turbine shaft 41 rotates, the cages 8 and 9 rotate together with the rolling elements, and the blade members 44 rotate about the axis C. The rotating blade members 44 produce an air flow within the center hole 43 so as to render the pressure within the center hole 43 negative relative to the pressure within the tank portion 35. As a result, the lubricating oil is drawn up from the tank portion 35 and is automatically flowed to the center hole 43 via the passage 48.

Further, this turbocharger includes a wick member (not shown) serving as the supply means K for supplying the lubricating oil from the tank portion 35 to the center hole 43, the wick member being provided between the tank portion 35 and the center hole 43. The wick member is made of such a material that the lubricating oil penetrates into the wick member. One end portion of the wick member is immersed in the lubricating oil stored in the tank portion 35, and the other end portion thereof is disposed at the rolling bearing (10) portion within the center hole 43. With this construction, the lubricating oil in the tank portion 35 is supplied to the center hole 43 by a capillary action of the wick member. With the use of this wick member, the lubricating oil can be supplied to the rolling bearings 10 within the center hole 43 even when the rotation of the turbine shaft 41 is stopped.

Incidentally, this wick member may be provided together with the blade members 44 and the passage 48, or one of these supply means may be provided.

In the turbocharger of the above construction, the lubricating structure is not of the type in which engine oil supplied from the exterior of the turbocharger is used as lubricating oil for the rolling bearings 10*a* and 10*b* as in a conventional structure, but is of the type in which the lubricating oil for the rolling bearings 10*a* and 10*b* is circulated only within the housing 40. Therefore, the lubricating oil will not be contaminated with foreign matters such as carbon sludge developing in the engine. Therefore, a good lubricating condition of the rolling bearings 10*a* and 10*b* can be maintained for a long period of time. And besides, any passage for receiving lubricating oil from the exterior does not need to be formed in the body portion 40*a* of the housing 40. Therefore, the cooling water jacket 26 can be provided within the body portion 40*a* of the housing 40 over the wide range from the one axial end portion 49 to the other axial end portion 50 as shown in FIG. 1. The inlet and outlet (not shown) for the coolant are formed in the body portion 40*a*, and the coolant flows through the cooling water jacket 26 in a circulating manner, and therefore the cooling effect can be enhanced by this cooling water jacket 26 of a large capacity, and the rolling bearings 10*a* and 10*b* can be cooled by the coolant over the wide range in the axial direction of the housing 40. As a result, the temperature of the rolling bearings 10*a* and 10*b* can be kept to a low level.

Thus, the lubricating structure for the rolling bearings 10*a* and 10*b* and the large cooling water jacket 26 for cooling the rolling bearings 10*a* and 10*b* can be provided within the housing 40, and the structure can be formed into a simplified and compact design.

Although not shown, there may be used a modified lubricating structure for the rolling bearings 10*a* and 10*b* in this turbocharger, in which a tank portion for storing lubricating oil is provided in the vicinity of the body portion 40*a* of the housing 40, and the lubricating oil is supplied from this tank portion to the center hole 43 via supply means. In this case, also, the lubricating structure is of the type in which the lubricating oil for the rolling bearings 10*a* and 10*b* exists only within the housing 40. Namely, this tank portion, even though separate from the body portion 40*a*, is mounted on the body portion 40*a*, so that the tank portion and the body portion 40*a* are combined into a unitary structure, and it can be said that this tank portion is formed within the housing 40.

Furthermore, there may be used another modified lubricating structure in which a tank portion for storing lubrication oil for the rolling bearings 10*a* and 10*b* is provided outside of the housing 40, and the lubricating oil is supplied from this tank portion to the center hole 43 via supply means. Namely, in this lubricating structure, the lubricating oil for the rolling bearings 10*a* and 10*b* exists only in the housing 40, the tank portion and the supply means extending between the housing 40 and the tank portion.

In these lubricating structures, also, the lubricating oil for the rolling bearings 10*a* and 10*b* is flowed only between the center hole 43 within the housing 40 and the tank portion. Namely, each of these lubricating structures is independent of those portions where engine oil flows, and therefore the lubricating oil for the rolling bearings 10*a* and 10*b* will not be contaminated with foreign matters such as carbon sludge developing in the engine.

Next, the rolling bearings 10*a* and 10*b* provided in this turbocharger will be described. The pair of rolling bearings 10*a* and 10*b* (hereinafter referred to as "rolling bearings 10") have the same construction.

Figure 3:
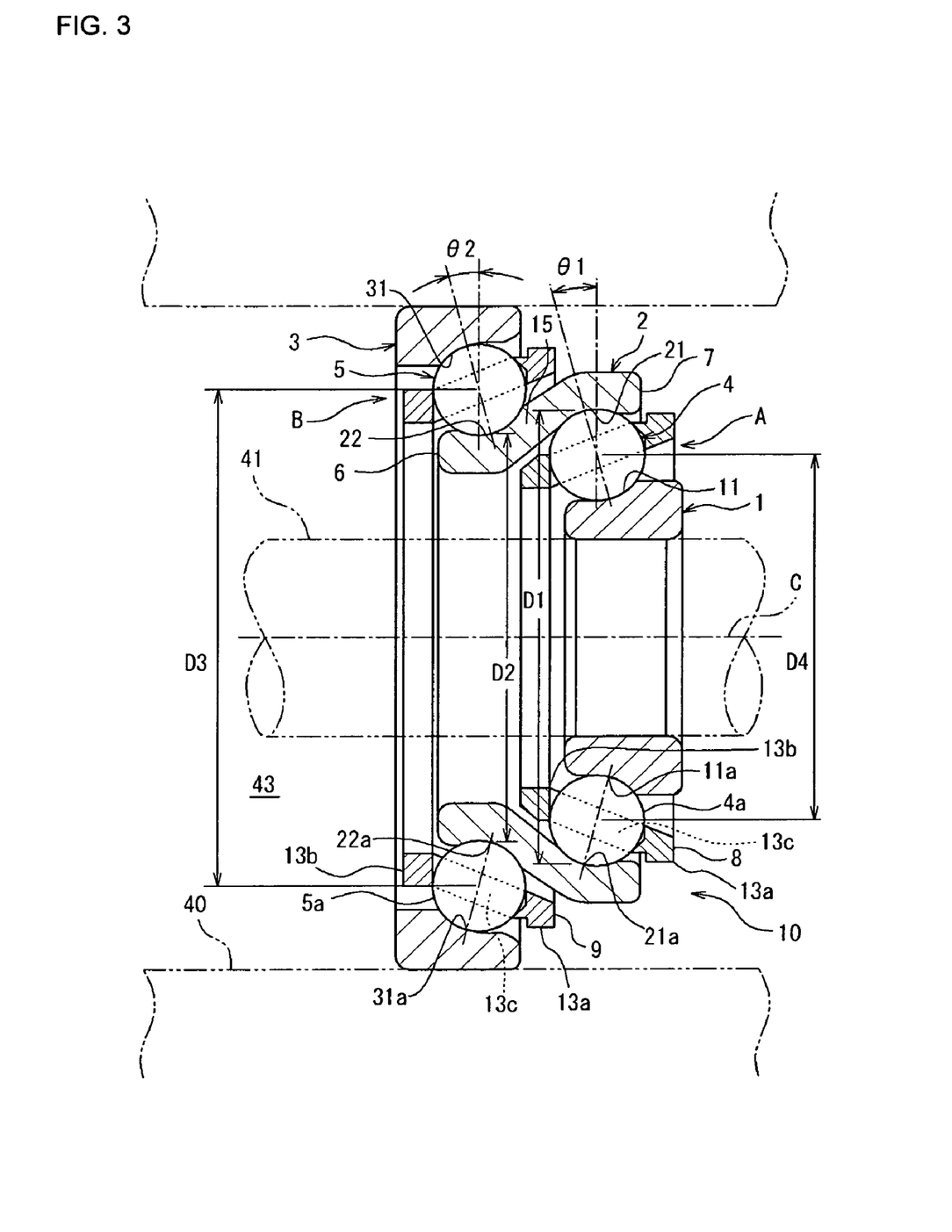
FIG. 3 is a cross-sectional view of a rolling bearing employed in the supercharger of FIG. 1.

In FIG. 3, this rolling bearing 10 comprises a single inner ring 1 fitted on the turbine shaft 41, a single outer ring 3 fixed to the inner peripheral surface of the center hole 43 of the housing 40, and a single intermediate ring 2 interposed between the inner ring 1 and the outer ring 3. The inner ring 1, the intermediate ring 2 and the outer ring 3 are arranged in this order in the axial direction, and are offset relative to one another in the axial direction. The rolling bearing 10 further includes a row of first rolling elements 4 rollably disposed in an annular space formed between the inner ring 1 and the intermediate ring 2, and a row of second rolling elements 5 rollably disposed in an annular space formed between the intermediate ring 2 and the outer ring 3.

The first rolling elements 4 as well as the second rolling elements 5 comprise a plurality of balls, respectively. The plurality of balls 4*a* (the first rolling elements 4) are held on a circle (having its center disposed on the axis C) by the cage 8, while the plurality of balls 5*a* (the second rolling elements 5) are held on a circle (having its center disposed on the axis C) by the cage 9. The number of the radially-outwardly disposed balls 5*a* is larger than the number of the radially-inwardly disposed balls 4*a*. The balls 4*a* and 5*a* have the same diameter. Alternatively, the ball 4*a* and the ball 5*a* may be different in diameter from each other, and for example the diameter of the ball 5*a* may be smaller than the diameter of the ball 4*a*. When the diameter of the balls 5 is thus reduced, a friction torque at the bearing portion having the balls 5*a* can be reduced, and a rotation resistance of the rolling bearing 10 can be reduced. Therefore, a rotation response of the turbine shaft 41 is enhanced, and start-up characteristics (at the start-up when the number of revolutions abruptly increases) is enhanced, and a turbo lag can be suppressed more effectively.

The inner ring 1 is an annular member, and its inner peripheral surface serves as a fitting surface fitted on the turbine shaft 41, and a first raceway 11 contacting the balls 4*a* (the first rolling element 4) is formed on an outer peripheral surface of the inner ring 1.

The outer ring 3 is an annular member, and its outer peripheral surface serves as a fitting surface fitted on the inner peripheral surface of the center hole 43 of the housing 40, and a second raceway 31 contacting the balls 5*a* (the second rolling elements 5) is formed on an inner peripheral surface of the outer ring 3. An axial dimension of the inner ring 1 is generally equal to an axial dimension of the outer ring 3.

The intermediate ring 2 is an annular member, and is larger in axial dimension than the inner ring 1 and the outer ring 3. A third raceway 21 contacting the balls 4*a* (the first rolling elements 4) is formed on a portion of an inner peripheral surface of the intermediate ring 2, and a fourth raceway 22 contacting the balls 5*a* (the second rolling elements 5) is formed on a portion of an outer peripheral surface of the intermediate ring 2. The inner ring 1, the intermediate ring 2 and the outer ring 3 having their axes coinciding with the axis C are offset from one another in the direction of the axis C, and are arranged in concentric relation to one another.

The intermediate ring 2 includes a larger-diameter ring portion 7 of an annular shape, a smaller-diameter ring portion 6 of an annular shape, and an inclined ring portion 15 of an annular shape disposed between and interconnecting the larger-diameter and smaller-diameter ring portions 7 and 6. A diameter of an outer peripheral surface of the smaller-diameter ring portion 6 is smaller than a diameter of an outer peripheral surface of the larger-diameter ring portion 7. The inclined ring portion 15 extends linearly in inclined relation to the axis C. The larger-diameter ring portion 7 is disposed radially outwardly of the inner ring 1 with the row of first rolling elements 4 interposed therebetween. The outer ring 3 is disposed radially outwardly of the smaller-diameter ring portion 6 (which is axially continuous with the larger-diameter ring portion 7 through the inclined ring portion 15) with the row of second rolling elements 5 interposed therebetween. Therefore, the outer ring 3 can be reduced in diameter, and the rolling bearing 10 is formed into the structure in which the radial arrangement projecting much in the radial direction is avoided.

The annular third raceway 21 is formed at a boundary portion between the inner peripheral surface of the larger-diameter ring portion 7 and the inner peripheral surface of the inclined ring portion 15, and the fourth raceway 22 of an annular shape is formed at a boundary portion between the outer peripheral surface of the smaller-diameter ring portion 6 and the outer peripheral surface of the inclined ring portion 15. The intermediate ring 2 has a bent shape in its longitudinal cross-section.

A diameter D3 of a pitch circle of the second rolling elements 5 contacting the fourth raceway 22 is larger than a diameter D4 of a pitch circle of the first rolling elements 4 contacting the third raceway 21. Therefore, the row of first rolling elements 4 and the row of second rolling elements 5 can be arranged close to each other in the axial direction with the inclined ring portion 15 interposed therebetween, and the axial dimension of the rolling bearing 10 can be reduced. The diameter of the pitch circle means a diameter of a circle passing through the centers of the row of balls.

Furthermore, the balls 4a (the first rolling elements 4) are disposed in angular contact with the pair of opposed first and third raceways 11 and 21, and the balls 5a (the second rolling elements 5) are disposed in angular contact with the pair of opposed fourth and second raceways 22 and 31. Contact angles θ1 and θ2 for the first and second rolling elements are equal to each other, and for example are 15° in FIG. 3. Therefore, the rolling bearing 10 can receive loads (axial loads) in the direction of the axis C. Furthermore, the rolling bearing 10 is formed into the axial arrangement extending in the direction of the axis C, and therefore has an axial-damper performance.

Furthermore, the intermediate ring 2 is formed into a structure suited for achieving the angular contact of the rolling elements 4 and 5. Namely, the fourth raceway 22 is formed on the outer periphery of the intermediate ring 2 at the boundary portion between the smaller-diameter ring portion 6 and the inclined ring portion 15, and therefore with respect to shoulder portions disposed respectively at opposite sides of the fourth raceway 22, a diameter of the shoulder portion of the inclined ring portion 15 is larger than a diameter of the shoulder portion of the smaller-diameter ring portion 6. Therefore, the fourth raceway 22 can be formed into the angular contact raceway, utilizing the inclination of the inclined ring portion 15. Also, the third raceway 21 is formed at the boundary portion between the larger-diameter ring portion 7 and the inclined ring portion 15, and therefore with respect to shoulder portions disposed respectively at opposite sides of the third raceway 21, a diameter of the shoulder portion of the inclined ring portion 15 is smaller than a diameter of the shoulder portion of the larger-diameter ring portion 7. Therefore, the third raceway 21 can be formed into the angular contact raceway, utilizing the inclination of the inclined ring portion 15.

Thus, the inner ring 1 and the outer ring 3 need to be thickened at their one shoulder portions so that the row of rolling elements 4 and the row of rolling elements 5 can be disposed in angular contact with the inner ring 1 and the outer ring 3, respectively. However, the intermediate ring 2 does not need to be thickened at one shoulder portion (the inclined ring portion 5) so as to achieve the angular contact of the rolling elements 4 and 5. Therefore, the intermediate ring 2 can be simplified in structure, and can be easily produced by plastically deforming a cylindrical member having a peripheral wall with a uniform thickness.

In this intermediate ring 2, the smaller-diameter ring portion 6 is smaller in diameter than the larger-diameter ring portion 7 as described above, and a raceway diameter D2 of the fourth raceway 22 of the smaller-diameter ring portion 6 is smaller than a raceway diameter D1 of the third raceway 21 of the larger-diameter ring portion 7 (D2<D1). The raceway diameter D2 of the fourth raceway 22 is a diameter of the smallest-diameter portion of the raceway 22, and the raceway diameter D1 of the third raceway 21 is a diameter of the largest-diameter portion of the raceway 21.

In the above construction, the row of balls 4a (the first rolling elements 4) are rollably interposed between the pair of opposed first and third raceways 11 and 21 of the inner ring and intermediate rings 1 and 2, and the row of balls 5a (the second rolling elements 5) are rollably interposed between the pair of opposed second and fourth raceways 22 and 31 of the intermediate and outer rings 2 and 3. This rolling bearing 10 has the plurality of rows (two stages) of rolling elements 4 and 5 disposed between the inner ring 1 (fitted on the turbine shaft 41) and the outer ring 3 fixed to the housing 40. Namely, this rolling bearing 10 comprises a first bearing portion A formed by the inner ring 1, the first rolling elements 4 and the intermediate ring 2 serving as an outer ring, and a second bearing portion B formed by the intermediate ring 2 serving as an inner ring, the second rolling elements 5 and the outer ring 3.

In the rolling bearing 10 of the above construction, when the turbine shaft 41 is rotated at a predetermined number of revolutions, the inner ring 1 of the rolling bearing 10 is rotated at this predetermined number of revolutions relative to the outer ring 3. In this rotating condition, this predetermined number of revolutions is distributed to the first and second bearing portions A and B arranged in the two stages. Namely, although the inner ring 1 rotates together with the turbine shaft 41, the intermediate ring 2 rotates at a speed lower than the speed of rotation of the inner ring 1 (that is, in a decelerated condition) in accordance with the rotation of the inner ring 1. Therefore, the number of revolutions at each bearing portion is smaller than the above predetermined number of revolutions. More specifically, when the turbine shaft 41 is rotated, for example, at 200,000 r.p.m., the first (inner) bearing portion A close to the turbine shaft 41 rotates at 160,000 r.p.m., while the second (outer) bearing portion B close to the housing 40 rotates at 40,000 r.p.m., that is, at a speed lower than that of the first bearing portion A. The rotational speeds distributed respectively to the bearing portions A and B arranged in the multi-stages are automatically changed in accordance with the rotational speed of the turbine shaft 41 (that is, the rotational speed of the inner ring 1). At this time, the second bearing portion B including the outer ring 3 is rotated at a speed lower than that of the first bearing portion A including the inner ring 1, and the rotational speed is distributed to the bearing portions A and B in a predetermined ratio.

In the intermediate ring 2 of this rolling bearing 10, the fourth raceway 22 is formed on the outer peripheral surface of the boundary portion between the smaller-diameter ring portion 6 (smaller in diameter than the larger-diameter ring portion 7) and the inclined ring portion 15. With this construction, the second rolling elements 5 (contacting the fourth raceway 22 formed at the boundary portion between the smaller-diameter ring portion 6 and the inclined ring portion 5) are disposed at the radially inward position, and therefore the radial dimension of the rolling bearing 10 can be reduced. Namely, the outer diameter of the outer ring 3 can be reduced. Therefore, the inner diameter of the center hole 43 of the housing 40 (in which the rolling bearings 10a and 10b (see FIG. 1) are fixedly received) can be reduced. As a result, the capacity of the cooling water jacket 26 can be increased.

Furthermore, in the intermediate ring 2 of this rolling bearing 10, the third raceway 21 is formed on the inner peripheral surface of the boundary portion between the larger-diameter ring portion 7 and the inclined ring portion 15, and the fourth raceway 22 is formed on the outer peripheral surface of the boundary portion between the smaller-diameter ring portion 6 and the inclined ring portion 15. Therefore, the axial dimension of the rolling bearing 10 can be reduced.

Figure 5:
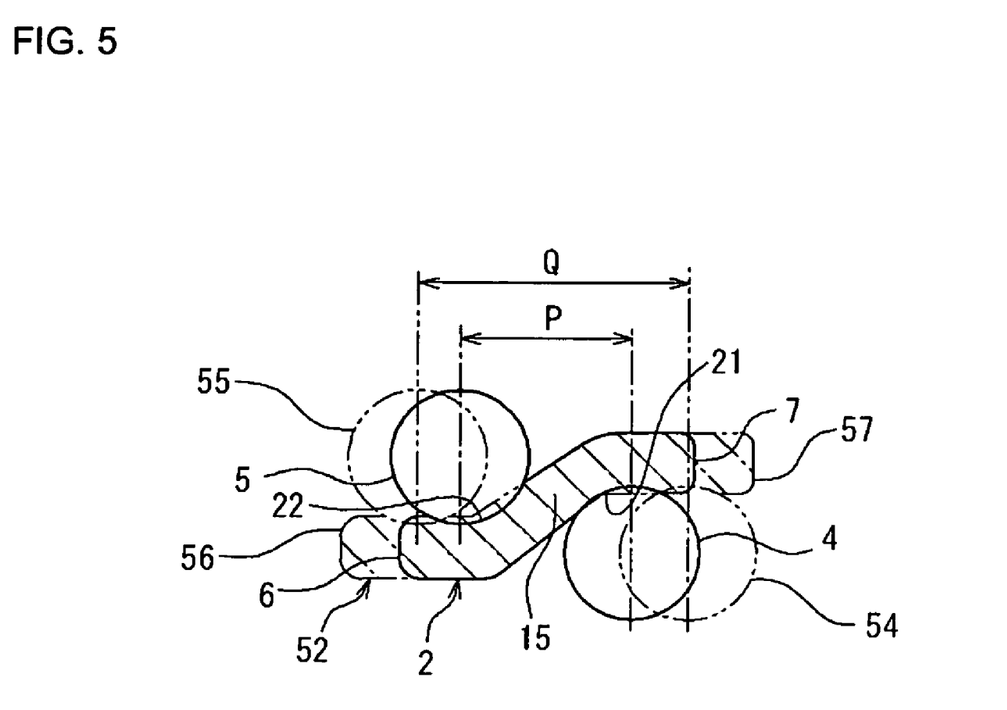
FIG. 5 is a view explanatory of an intermediate ring of the rolling bearing.

This will be described with reference to FIG. 5. In a comparative example in which a raceway is formed only on an inner periphery of a larger-diameter ring portion 57 of an intermediate ring 52 indicated in dots-and-dash lines, and also a raceway is formed only on an outer periphery of a smaller-diameter ring portion 56, the distance Q between a median plane of a row of rolling elements 54 and a median plane of a row of rolling elements 55 contacting the respective raceways is increased, and the overall axial length of the rolling bearing is increased. In the invention, however, part of the third raceway 21 and part of the fourth raceway 22 are formed respectively on the inner and outer peripheral surfaces of the inclined ring portion 15 as indicated in solid lines in FIG. 5, and therefore the distance P between a median plane of the row of rolling elements 4 and a median plane of the row of rolling elements 5 respectively contacting the third and fourth raceways 21 and 22 can be made smaller than the distance Q (P<Q). Namely, the row of rolling elements 4 and the row of rolling elements 5 can be disposed closer to each other, and therefore the axial dimension of the rolling bearing can be reduced.

Furthermore, part of the third raceway 21 and part of the fourth raceway 22 are formed respectively on the inner and outer peripheral surfaces of the inclined ring portion 15, and the pitch circle diameter D3 of the second rolling elements 5 contacting the fourth raceway 22 is larger than the pitch circle diameter D4 of the first rolling elements 4 contacting the third raceway 21, and therefore the row of first rolling elements 4 and the row of second rolling elements 5 can be disposed close to each other in the direction of the axis C. Therefore, the dimension of the rolling bearing 10 in the direction of the axis C can be reduced. Therefore, a space for receiving the rolling bearing 10 can be reduced in the axial direction, and other parts can be provided adjacent to the rolling bearing.

Furthermore, in the intermediate ring 2 shown in FIG. 3, a raceway surface 22a of the fourth raceway 22 is disposed radially inwardly of a raceway surface 21a of the third raceway 21, and therefore the row of second rolling elements 5 contacting the fourth raceway 22 are disposed closer to the axis C in the radial direction, and therefore the radial dimension of the rolling bearing can be further reduced.

Figure 4:
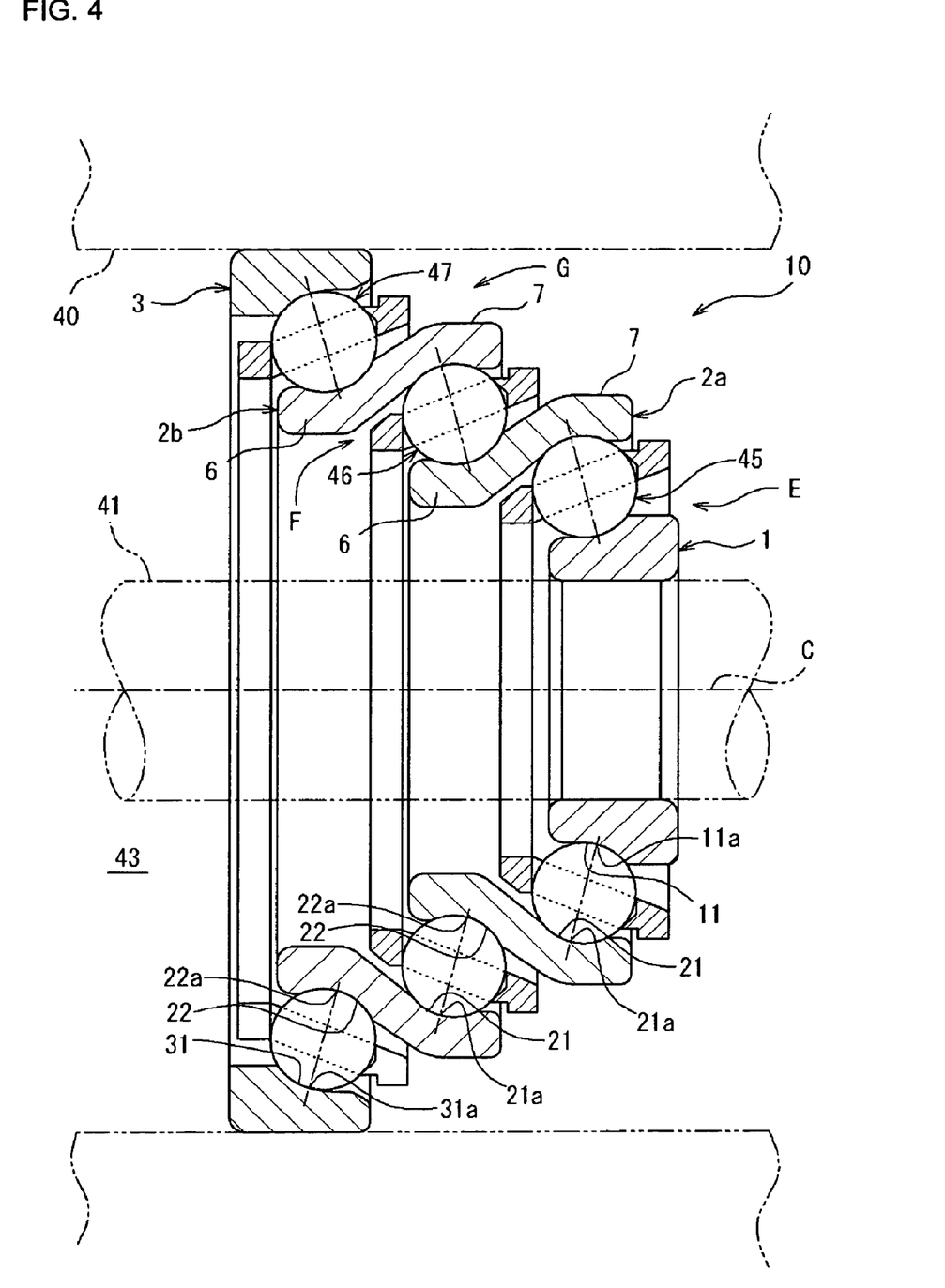
FIG. 4 is a cross-sectional view of a rolling bearing which can be employed in the supercharger of the invention.

The rolling bearing 10 of the invention is of such a type that at least one intermediate ring 2 is interposed between the inner and outer rings 1 and 3, and the plurality of rolling elements are rollably interposed between the opposed raceways of the inner and intermediate rings, and the plurality of rolling elements are rollably interposed between the opposed raceways of the intermediate and outer rings. Two intermediate rings 2a and 2b may be interposed between the inner and outer rings 1 and 3 as shown in FIG. 4. In this case, the inner ring 1, the first intermediate ring 2a, the second intermediate ring 2b and the outer ring 3 are arranged in this order in the axial direction, and are offset from one another in the axial direction. A row of first rolling elements 45 are rollably interposed between the inner ring 1 and the first intermediate ring 2a, and a row of second rolling elements 46 are rollably interposed between the first intermediate ring 2a and the second intermediate ring 2b, and a row of third rolling elements 47 are rollably interposed between the second intermediate ring 2b and the outer ring 3.

The intermediate rings 2a and 2b are identical in construction to the intermediate ring 2 of the above embodiments, and each of the intermediate rings 2a and 2b includes a larger-diameter ring portion 7 of an annular shape, a smaller-diameter ring portion 6 of an annular shape, and an inclined ring portion 15 of an annular shape disposed between and interconnecting the larger-diameter and smaller-diameter ring portions 7 and 6. In each of the intermediate ring portions 2a and 2b, a third raceway 21 is formed at a boundary portion between an inner peripheral surface of the larger-diameter ring portion 7 and an inner peripheral surface of the inclined ring portion 15, and a fourth raceway 22 is formed at a boundary portion between an outer peripheral surface of the smaller-diameter ring portion 6 and an outer peripheral surface of the inclined ring portion 15.

This rolling bearing 10 includes the three rows of rolling elements 45, 46 and 47 arranged in three stages between the inner ring 1 (fitted on the turbine shaft 41) and the outer ring 3 fixed to the housing 40. Namely, this rolling bearing 10 comprises a first bearing portion E formed by the inner ring 1, the first rolling elements 45 and the first intermediate ring 2a serving as an outer ring, a second bearing portion F formed by the first intermediate ring 2a serving as an inner ring, the second rolling elements 46 and the second intermediate ring 2b serving as an outer ring, and a third bearing portion G formed by the second intermediate ring 2b serving as an inner ring, the third rolling elements 47 and the outer ring 3. With this construction, the overall number of revolutions of the rolling bearing 10 are distributed to the bearing portions E, F and G, and the rolling bearing 10 well suited for a higher-speed operation can be obtained.

In the rolling bearing 10 of the invention, its component parts can be made of known materials, and particularly when the balls (rolling elements) and the intermediate ring are made of lightweight ceramics materials, there is achieved the structure capable of supporting the shaft rotating at still higher speed.

In the rolling bearing of each of the above embodiments, the inner ring 1 can rotate relative to the outer ring 3 at the number of revolutions which is the sum of the revolution numbers of the rows of rolling elements, that is, the bearing portions. With this construction, the rolling bearing 10 as a whole can be well suited for the high-speed rotation. Thus, in this rolling bearing 10, the overall allowable number of revolutions is increased, and the rolling bearing 10 can support the rotating turbine shaft 41 with higher safety, and can stably support the turbine shaft 41 even when this turbine shaft 41 rotates at high speed.

Furthermore, the overall number of revolutions is distributed to the bearing portions, and therefore a temperature rise due to the high-speed rotation can also be suppressed. Therefore, a dimensional change of the bearing portions due to a temperature change can also be reduced to a low level. And besides, since the number of revolutions at each bearing portion is reduced, an advantageous effect can be obtained with respect to lubricant for the rolling bearing 10. Namely, a temperature rise is suppressed, and therefore there can be used the type of lubricant which is lower in thermal resistant and cheaper than lubricant heretofore used. And besides, vegetable oil which is more advantageous in the preservation of the global environment and biodegradable oil can be used.

Furthermore, the overall number of revolutions is distributed to the multi-stage bearing portions, so that the number of revolutions at each bearing portion is reduced, and therefore the rotation resistance at each bearing portion is reduced. Therefore, the rolling bearing 10 can be formed into a low torque structure as a whole. Therefore, in the turbocharger employing such rolling bearings 10, the rotation torque is reduced at the rolling bearings 10, and therefore a rotation response is enhanced, and a turbo lag can be suppressed.

Furthermore, the bearing portions are arranged in the multi-stages, and therefore when applying a preload to the rolling bearing 10, the adjustment of the preload can be effected for each of the bearing portions. Therefore, the preload for the whole of the rolling bearing 10 can be adjusted minutely and precisely.

Furthermore, each of the cages has an annular shape, and each cage, when viewed in a cross-section, is inclined from one end thereof to the other end thereof in the direction of the axis C as shown in FIGS. 3 and 4. More specifically, in FIG. 3, each of the cages 8 and 9 includes a larger-diameter portion 13*a*, a smaller-diameter portion, and an inclined portion 13*c* interconnecting the larger-diameter and smaller-diameter portions 13*a* and 13*b* in the axial direction, and this inclined portion 13*c* is inclined in a similar manner to the inclined ring portion 15 of the intermediate ring 2. With this construction, when the balls 4*a*, 5*a* roll, the cage 8, 9 stirs the air in the vicinities of the balls 4*a*, 5*a*, thereby enhancing the cooling effect. The above-mentioned blade member (not shown) comprising a plurality of blades can be provided at the cage 8, 9.

The rolling bearings 10 are not limited to the above embodiments, and may take any other suitable form, and the number of the intermediate rings may be more than two. In this case, the number of revolutions at each bearing portion is further reduced, and the rolling bearing well suited for still higher speed can be obtained.

The invention claimed is:

1. A supercharger, comprising:
    a housing having a cooling water jacket provided therein; and
    a turbine shaft supported in a center hole in a center portion of the housing through a rolling bearing, a turbine being mounted on one end portion of the turbine shaft and disposed exteriorly of the housing in an axial direction,
    wherein lubricating oil for the rolling bearing exists only within the housing,
    wherein the cooling water jacket is provided within a body portion of the housing over a region from one axial end portion of the body portion to an other axial end portion thereof, and
    wherein the cooling water jacket comprises a portion within the body portion that is disposed between the turbine and an end portion of the rolling bearing that is closer to the turbine than other parts of the rolling bearing.

2. The supercharger according to claim 1, wherein the cooling water jacket comprises a passage for flowing a coolant at least more than one round around the center hole in a circumferential direction.

3. The supercharger according to claim 2, wherein the passage is constructed such that the coolant is flowed circumferentially in one direction, and then is turned back, and is flowed circumferentially in an other direction opposite to the one direction.

4. The supercharger according to claim 3, wherein the passage includes at least one first passage portion for flowing the coolant in the one direction, at least one second passage portion for flowing the coolant in the other direction, and at least one turning-back passage portion interconnecting the first passage portion and the second passage portion, and the first passage portion and the second passage portion are juxtaposed in the axial direction.

5. The supercharger according to claim 1, wherein the portion of the cooling water jacket is disposed on a surface of a portion of the center portion that has a diameter that is less than a diameter of a remaining portion of the center portion.

6. The supercharger according to claim 1, further comprising a thermal shield member interposed between the turbine and the housing,
    wherein an air chamber is interposed between the thermal shield member and the housing.

7. The supercharger according to claim 1, further comprising a tank portion for storing the lubricating oil provided within the housing or in a vicinity of the body portion of the housing, and supply means for supplying the lubricating oil from the tank potion to the center hole.

8. The supercharger according to claim 7, wherein the supply means comprises a blade member for producing an air flow within the center hole in accordance with a rotation of the turbine shaft to render a pressure within the center hole negative relative to a pressure within the tank portion, and a lubricant passage leading from the tank portion to the center hole, and the lubricating oil is drawn up from the tank portion by the negative pressure, and flows to the center hole via the lubricant passage.

9. The supercharger according to claim 7, wherein the supply means includes a wick member provided between the tank portion and the center hole to supply the lubricating oil from the tank portion to the center hole by a capillary action of the wick member.

10. A supercharger, comprising:
    a housing having a cooling water jacket provided therein; and
    a turbine shaft supported in a center hole in a center portion of the housing through a rolling bearing, a turbine being mounted on one end portion of the turbine shaft and disposed exteriorly of the housing in an axial direction,
    wherein the cooling water jacket comprises a passage for flowing a coolant at least more than one round around the center hole in a circumferential direction, and
    wherein the cooling water jacket comprises a portion that is disposed between the turbine and an end portion of the rolling bearing that is closer to the turbine than other parts of the rolling bearing.

11. The supercharger according to claim 10, wherein the passage is constructed such that the coolant is flowed circumferentially in one direction, and then is turned back, and is flowed circumferentially in an other direction opposite to the one direction.

12. The supercharger according to claim 11, wherein the passage includes at least one first passage portion for flowing the coolant in the one direction, at least one second passage portion for flowing the coolant in the other direction, and at least one turning-back passage portion interconnecting the first passage portion and the second passage portion, and the first passage portion and the second passage portion are juxtaposed in the axial direction.

13. The supercharger according to claim 10, wherein the portion of the cooling water jacket is disposed on a surface of a portion of the center portion that has a diameter that is less than a diameter of a remaining portion of the center portion.

14. The supercharger according to claim 10 further comprising a thermal shield member interposed between the turbine and the housing,
wherein an air chamber is interposed between the thermal shield member and the housing.

15. The supercharger according to claim 10, further comprising a tank portion for storing the lubricating oil provided within the housing or in a vicinity of the body portion of the housing, and supply means for supplying the lubricating oil from the tank potion to the center hole.

16. The supercharger according to claim 15, wherein the supply means comprises a blade member for producing an air flow within the center hole in accordance with a rotation of the turbine shaft to render a pressure within the center hole negative relative to a pressure within the tank portion, and a lubricant passage leading from the tank portion to the center hole, and the lubricating oil is drawn up from the tank portion by the negative pressure, and flows to the center hole via the lubricant passage.

17. The supercharger according to claim 15, wherein the supply means includes a string member provided between the tank portion and the center hole to supply the lubricating oil from the tank portion to the center hole by a capillary action of the string member.

18. The supercharger according to claim 1, wherein the cooling water jacket comprises a passage for flowing a coolant at least more than one round along the axial direction and around the center hole in a circumferential direction.

19. The supercharger according to claim 1, wherein the cooling water jacket further comprises another portion within the body portion that has a diameter that is greater than a diameter of the portion of the cooling water jacket,
wherein the portion of the cooling water jacket comprises an annular portion.

* * * * *